R. B. RENNER.
ELEVATOR.
APPLICATION FILED DEC. 20, 1911.
1,086,398.
Patented Feb. 10, 1914.
4 SHEETS—SHEET 1.
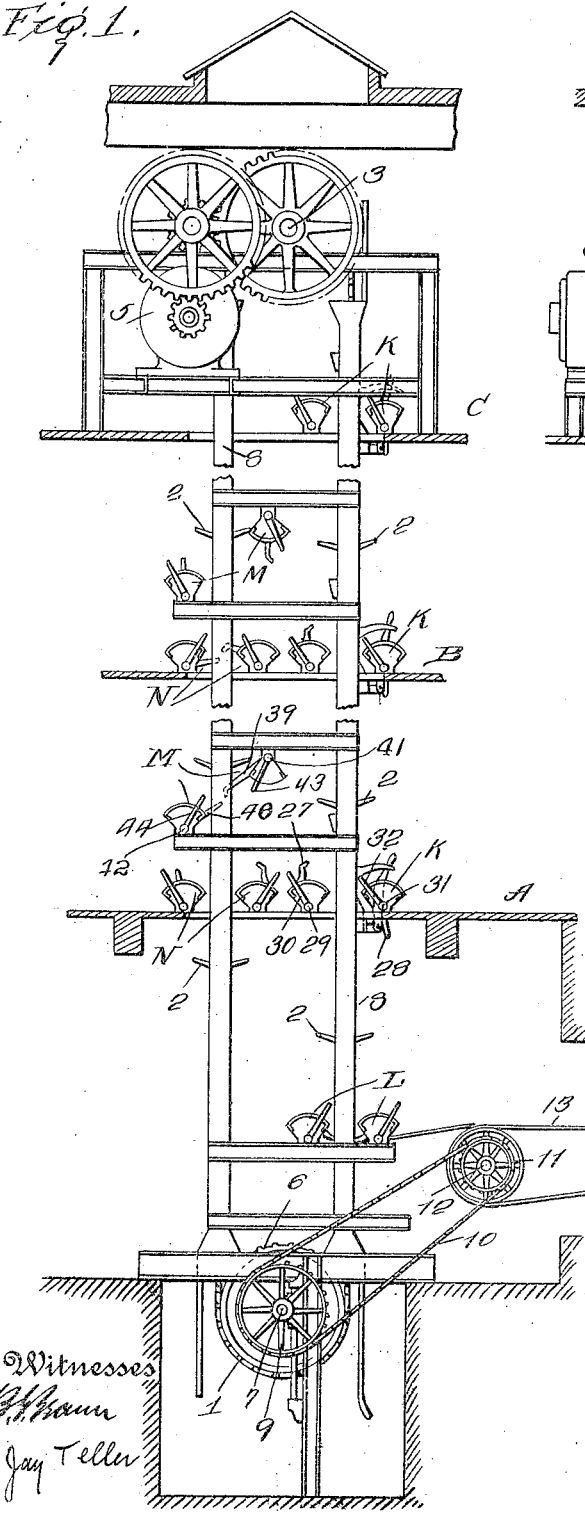
Witnesses
B. F. Brown
S. Jay Teller
Inventor
Roland B. Renner
By N. H. Blies
Attorney

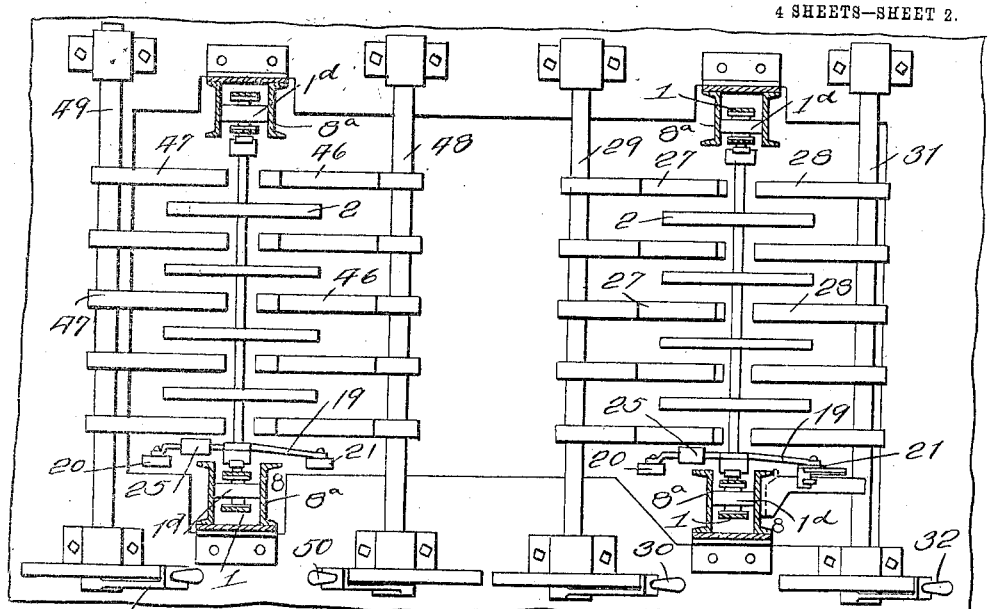
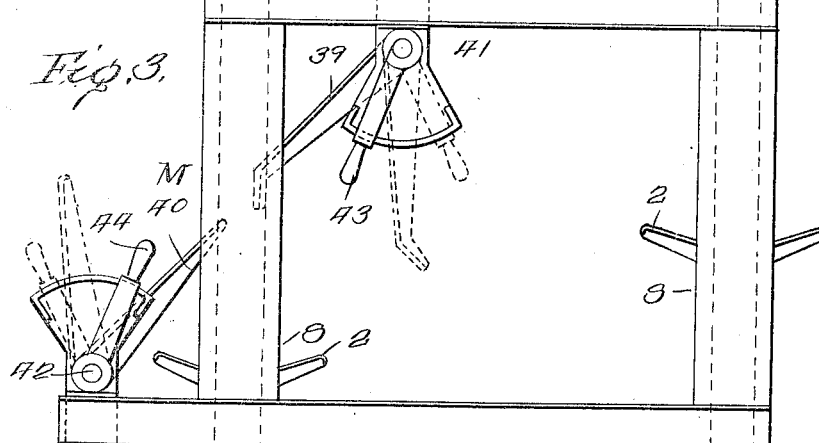

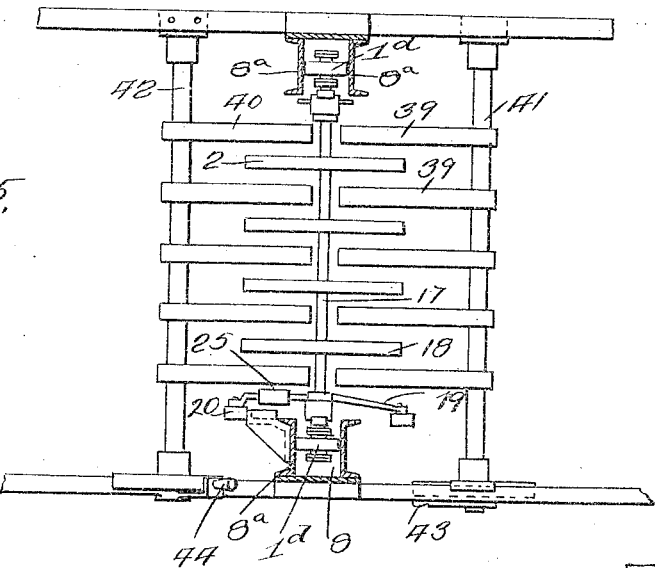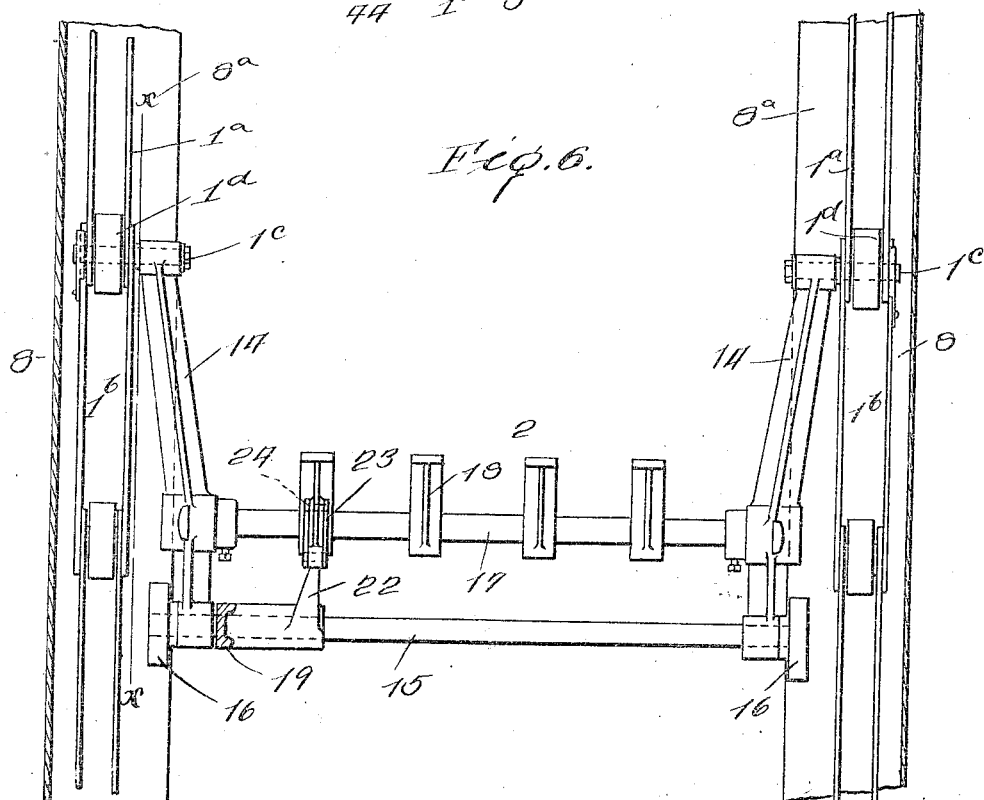

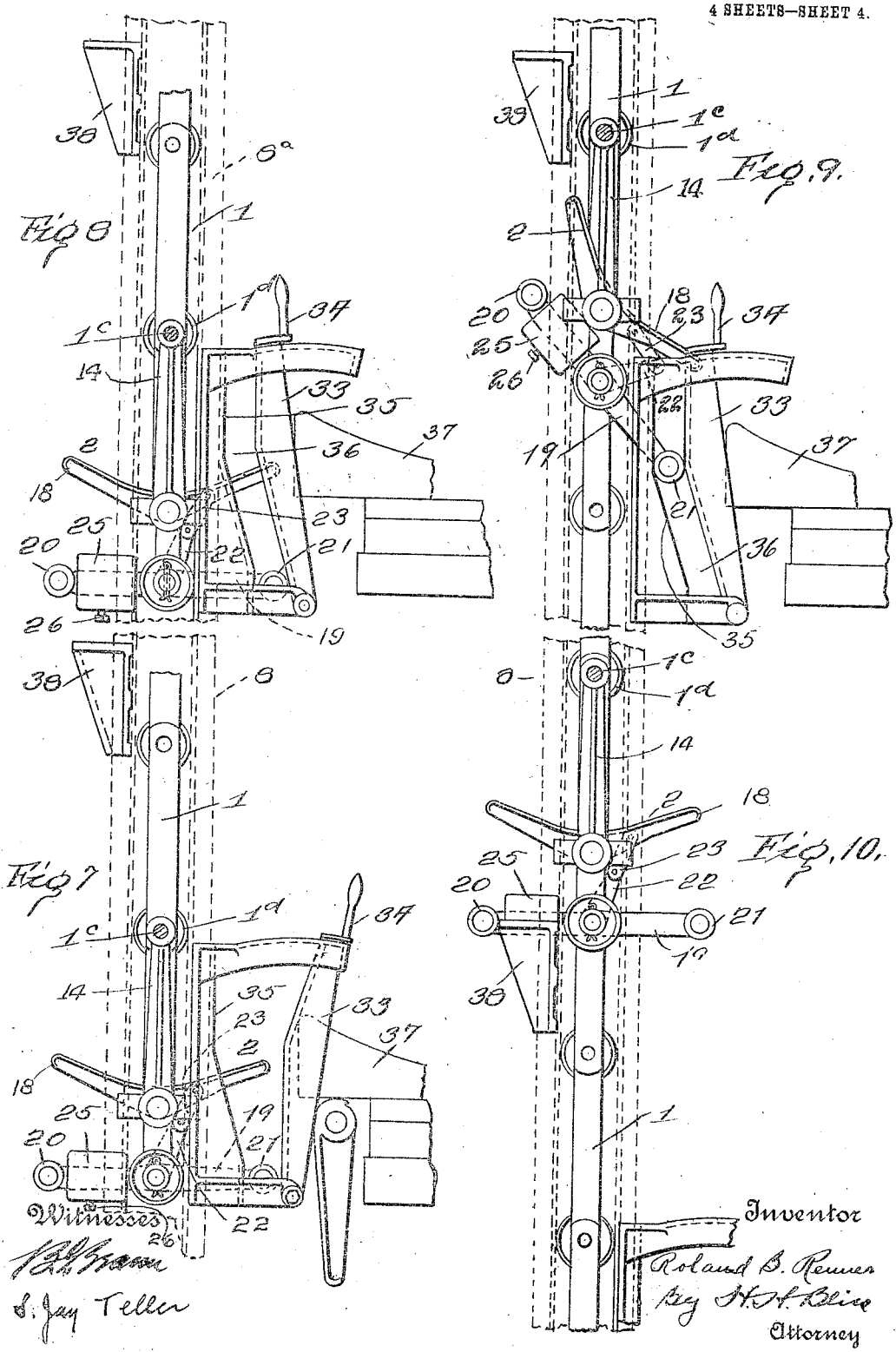

UNITED STATES PATENT OFFICE.

ROLAND B. RENNER, OF COLUMBUS, OHIO, ASSIGNOR TO THE JEFFREY MANUFACTURING COMPANY, A CORPORATION OF OHIO.

ELEVATOR.

1,086,398.  Specification of Letters Patent.  Patented Feb. 10, 1914.

Application filed December 20, 1911.  Serial No. 666,950.

*To all whom it may concern:*

Be it known that I, ROLAND B. RENNER, a citizen of the United States, residing at Columbus, in the county of Franklin and State of Ohio, have invented certain new and useful Improvements in Elevators, of which the following is a specification, reference being had therein to the accompanying drawing.

This invention relates to endless conveyers or elevators of the tray type. It is especially applicable to elevators used for transferring boxes, bags or barrels, either upward or downward from one floor to another of a warehouse.

One of the objects of the invention is to provide an improved general construction and arrangement of devices for loading and unloading the elevator trays at one floor or another.

A further object is the provision of an improved construction for the trays and tray carrying parts.

A still further object is the provision of improved means for effecting the loading and unloading of the trays at various points.

In the accompanying drawings which form a part of this application I have shown a complete conveyer system embodying my improvements. It will be understood, however, that so far as certain features of my invention are concerned various changes may be made in the arrangement of the parts.

Of the drawings, Figure 1 is a side elevation of a conveyer system embodying my improvements in place in a warehouse. Fig. 2 is an end view of the conveyer system shown in Fig. 1. Fig. 3 is an enlarged fragmentary side elevation showing the loading and unloading devices at one of the floors. Fig. 4 is a cross sectional plan view taken along the line 4—4 of Fig. 3. Fig. 5 is a cross sectional plan view taken along the line 5—5 of Fig. 3. Fig. 6 is a side elevation of one of the trays and the chains to which it is attached. Fig. 7 is a sectional side elevation of one of the unloading devices taken along the line $x$, $x$ of Fig. 6, the parts being arranged in position to permit a tray to pass without being dumped. Fig. 8 is a view similar to Fig. 7 but showing the parts in position to cause dumping. Fig. 9 shows a tray in dumped position. Fig. 10 shows a tray restored to its original position.

Referring to the drawings, A, B, and C represent the floors of a building, it being understood that there may be any desired number of floors. Through suitable vertically alined openings in the floors there extends a conveyer or elevator which comprises the two endless chains 1, 1 and the trays 2, 2 carried by the chains. Upon the top of the building there is mounted a horizontal shaft 3 provided with sprocket wheels 4, 4 over which pass the two chains 1, 1. A motor 5 is connected with the shaft 3 by means of suitable gearing such as that indicated in the drawings and serves to drive the sprocket wheels 4, 4, and through them the elevator chains and trays. At the bottom of the building the chains 1, 1 pass over sprocket wheels 6, 6 which are mounted on a horizontal shaft 7. This shaft 7 together with the sprocket wheels carried by it is preferably movable in order that proper adjustment may be made in accordance with the variations in the lengths of the chains on account of wear or temperature. Vertical guides 8, 8 are provided for the chains. These will be fully described hereinafter.

In the drawings I have shown a sprocket wheel 9 mounted on the shaft 7 and connected by means of a chain 10 with a sprocket wheel 11 on the shaft 12 of the belt conveyer 13. In this way power may be supplied for driving the belt conveyer. This belt conveyer may be used for carrying articles to be transferred by the elevating mechanism. But this belt conveyer constitutes no part of my present invention and extended description of it is unnecessary.

At the ascending side of the conveyer, devices K, K are provided preferably at each of the floors for effecting the loading or unloading of the trays. A loading device L is preferably also provided in the basement below the lower floor A in position to receive articles discharged from the belt conveyer 13. At the descending side of the conveyer unloading devices M, M and N, N are provided. These have been shown only at the floors A and B, but it will be understood that similar devices can be provided for the other floors. It will be understood that the arrangement is such that at the ascending side of the conveyer articles may be placed on or removed from any of the trays at any floor, and that at the descending side, articles may be removed from the trays at any floor provided with unloading devices.

Each of the chains 1 comprises series of links 1ª, 1ª, and 1ᵇ, 1ᵇ which are pivotally connected together by pins 1ᶜ upon which are mounted rollers 1ᵈ. These rollers engage with and are guided by the guides 8 which have been heretofore referred to. Each of these guides 8 is preferably made up of two channel bars 8ª, 8ª. At intervals along the chains are connected the trays 2 which have been before briefly referred to. Each tray has at each end a vertical suspension link 14 which has a bearing at its upper end on an extended part of one of the pins 1ᶜ. The links 14 are fastened together at their ends by means of the tie rod 15. At the ends of the tie rod 15 are rotatably mounted rollers 16 which run between and are guided by the channel bars 8ª, 8ª. Rotatably mounted in suitable bearings intermediate the ends of the links 14 is a transverse horizontal shaft 17. Rigidly mounted upon this shaft 17 at regular intervals are carrier arms 18, 18. At one end of the tie rod 15 and mounted thereon by a bearing intermediate its ends is a horizontal operating bar 19. This bar is provided at its ends with rotatable rollers 20, and 21. The bar 19 is provided with an upward projecting arm 22 to the upper end of which is pivotally connected a link 23. The other end of this link 23 is pivotally connected at 24 with one of the carrier arms 18. The arm 22 and the link 23 together form a toggle connection between the shaft 15 and the carrier part of the tray and serve to normally hold the tray in horizontal operative position. In order that the tray may not be accidently jarred out of this horizontal position, a weight 25 is provided on the lever 19. The position of this weight 25 may be adjusted and it may be held in place by a set screw 26.

For loading the trays when on the ascending side of the conveyer, two sets of fingers 27, 27 and 28, 28 are provided. The fingers 27, 27 are mounted on a shaft 29 which is controlled by a hand lever 30. This lever may be locked either in the position shown by full lines in Fig. 3 or in the position shown by dotted lines. The fingers 28, 28 are mounted on the shaft 31 which is controlled by the hand lever 32. This hand lever may be locked, either in the position shown by full lines or in the position shown by dotted lines. The upper ends of the fingers 28 are preferably in substantial alinement with the floor so that a barrel or other object can be moved along the floor and into the pocket or depression formed by the two sets of fingers. As one of the trays 2 moves upward its arms 18 pass between the fingers 27, 27 and 28, 28 and lift from them any object which they support. The fingers 27, 27 and 28, 28 are moved into the inoperative positions shown by dotted lines in Fig. 3 when it is desired to permit loaded trays from lower floors to pass.

In order that an upward moving tray may be unloaded I provide the unloading devices which are shown most clearly in Figs. 7 to 10. At a point adjacent the path of the rollers 21 on the levers 19 there is pivoted an upstanding cam arm 33 which is controlled by the handle 34, and which can be locked either in the position shown in Fig. 7 or in the position shown in Figs. 8 and 9. When the cam lever 33 is in the position shown in Fig. 7, a loaded tray will pass smoothly upward without being acted upon.

When the cam lever 33 is moved into the position shown in Figs. 8 and 9 it coöperates with a stationary cam 35 to form a parallel sided groove 36 through which the roller 21 of the tray is forced to pass as the tray moves upward. The groove 36 is inclined at its lower end and this inclination is sufficient to cause the lever 19, together with the arm 22, to move sufficiently to break the toggle and to bring the carrier arms of the tray into the sharply inclined position shown in Fig. 9. The upper part of the groove is vertical and the carrier arms are, therefore, held rigidly in their inclined position until their load can be discharged by gravity. Removable skids 37 are preferably provided to receive articles discharged from the trays.

After a tray has been moved into inclined dumping position in the manner just described it is returned to its normal horizontal position by the stationary cam 38 which engages the roller 20 at the end of the lever 19 opposite to the roller 21. The cam 38 forces the roller 20 downward and outward with respect to the other parts of the tray, and as a result the lever 19 and the carrier arms 18 are returned to horizontal positions.

Two independent sets of devices are provided at each unloading floor for removing articles from the trays on the descending side of the conveyer. The set of devices indicated by M is especially adapted for removing boxes or bags which will not readily roll. The set of devices indicated at N are especially adapted for barrels or cylindrical objects which will roll on a relatively slight incline. The devices at M comprise two sets of fingers 39, 39 and 40, 40 mounted respectively on the shafts 41 and 42. Operating levers 43 and 44 are connected to the shafts 41 and 42 and these levers can be locked either to hold the fingers in the positions indicated by full lines in Fig. 3 or in the positions indicated by dotted lines. When the fingers are in the full line positions they will project between the carrier arms of a descending tray and engage with an object carried thereon to push it laterally off from the tray and onto the floor or a suitable table or truck. When the fingers are in the dotted line positions a loaded tray may freely pass without its load being acted upon. The unloading devices at N comprise the two sets of fingers 46, 46 and 47, 47 mounted respectively on the shafts 48 and 49. The shafts 48 and 49 are controlled by the levers 50 and 51 which can be locked, either to hold the fingers in the positions shown by dotted lines in Fig. 3 or in the positions shown by full lines. When the fingers are in the dotted line positions they will engage a barrel or cylindrical object on a tray and support it until it rolls down the inclined fingers 47, 47 onto the floor. When the fingers are in the full line positions they will permit a loaded tray to pass without its load being acted upon.

From the foregoing description it will be apparent that I have by my invention provided an arrangement such that trays can be loaded either at L or at any of the floors A, B or C, and can be unloaded at A, B or C on the ascending side, or at B or A on the descending side.

What I claim is:

1. In a vertically movable tray conveyer, the combination of a tray mounted for movement about a horizontal axis, toggle links for locking the tray in carrying position, stationary means for upsetting the toggle and positively moving the tray into an inclined dumping position as the tray moves upward, and stationary means for positively returning the tray to normal horizontal position as the tray continues to move upward.

2. In a vertically moving tray conveyer, the combination of a tray mounted for movement about a horizontal axis, a normally horizontal bar connected to the tray, a stationary cam for engaging one end of the bar to tilt the tray into inclined dumping position as it moves upward, and a second cam adapted to engage the other end of the bar to return the tray into its normal horizontal position as the tray continues to move upward.

3. In a vertically movable tray elevator, the combination of a carrier, a tray mounted on the carrier for movement about a horizontal axis, a toggle link for locking the tray in carrying position, a bar mounted on the carrier for movement about an axis separate from but parallel to the axis of the tray, a connection between the bar and the tray, a stationary cam adapted to engage the bar to move it and thereby cause the upsetting of the toggle and movement of the tray into inclined dumping position as the tray moves upward, and a second stationary cam adapted to be engaged by the other end of the bar to cause the tray to be returned to its normal horizontal position.

4. In a vertically movable tray elevator, the combination of a carrier, a tray mounted on the carrier for movement about a horizontal axis, a normally horizontal bar mounted on the carrier for movement about a horizontal axis separate from the axis of the tray, a connection between the arm and the tray for maintaining the arm and the tray substantially parallel, a stationary cam for engaging one end of the arm to cause the movement of the tray into an inclined dumping position as it moves upward, and a second stationary cam adapted to engage the other end of the bar to cause the tray to be returned into its normal horizontal position as it continues to move upward.

5. In a vertically movable tray conveyer, the combination of a carrier, a tray mounted on the carrier for movement about a horizontal axis, a horizontal bar pivotally mounted on the carrier and connected with the tray, a normally stationary cam for engaging one end of the bar to cause movement of the tray into an inclined dumping position as it moves upward, a second stationary cam for engaging the other end of the bar to cause the tray to be returned to its normal horizontal position as it continues to move upward, and a manually controllable means for moving the first said cam into or out of the path of the said bar.

6. In a vertically movable tray conveyer, the combination of a carrier, a tray mounted on the carrier for movement about a horizontal axis, a bar pivotally mounted on the carrier and connected with the tray, a cam provided with an inclined groove adjacent the path of one end of the said arm, a projection on the arm adapted to enter the said groove and engage the walls thereof to cause movement of the said bar and the said tray into inclined positions, and means for returning the bar and the tray to normal horizontal positions after disengagement of the projection from the walls of the groove.

7. In a vertically movable tray conveyer, the combination of a carrier, a tray mounted on the carrier and capable of movement about a horizontal axis, an arm pivotally mounted on the carrier and connected with the tray, a cam having a groove which is inclined at its lower end and vertical at its upper end, a projection on the said bar adapted to enter the groove and to be guided between the walls thereof, the position of the groove being such that the bar is moved while in engagement with the inclined part of the groove to bring the tray into inclined dumping position, and while in engagement with the vertical part of the groove is held stationary, and means for returning the bar and the tray to normal horizontal positions.

8. In a vertically movable tray elevator, the combination of a carrier, a tray mounted on the carrier and capable of movement about a horizontal axis, a bar pivotally mounted on the carrier and connected with the tray, a stationary cam having an inclined groove, a projection on the bar adapted to enter the groove and to be guided by the walls thereof to bring the tray into inclined dumping position, means for returning the bar and the carrier to normal horizontal positions, and means for moving one of the walls of the cam out of position to engage the said projection on the bar.

9. In a vertically movable tray elevator, the combination of a carrier, a tray mounted on the carrier and capable of movement about a horizontal axis, a bar mounted on the carrier and connected with the tray, a cam adjacent the path of the end of the bar and provided with a groove, the lower end of which is inclined and the upper end of which is vertical, a projection on the end of the bar adapted to enter the groove and to be guided by the walls thereof, the arrangement being such that the projection is guided by the inclined part of the groove to cause movement of the tray into inclined dumping position and during engagement with the vertical part of the groove walls holds the tray in the said inclined dumping position, means for returning the tray to its normal horizontal position, and means for moving one wall of the groove to permit the unobstructed passage of the said projection on the bar.

In testimony whereof I affix my signature, in presence of two witnesses.

ROLAND B. RENNER.

Witnesses:
W. J. BRUNER,
DUDLEY T. FISHER.